(12) United States Patent
Berge

(10) Patent No.: US 8,918,967 B2
(45) Date of Patent: Dec. 30, 2014

(54) RELEASABLE PACK FOR PARACHUTING WHEN CARRYING EQUIPMENT

(75) Inventor: Michael Scott Berge, Redondo Beach, CA (US)

(73) Assignee: 5.11, Inc., Irvine, CA (US)

( * ) Notice: Subject to any disclaimer, the term of this patent is extended or adjusted under 35 U.S.C. 154(b) by 96 days.

(21) Appl. No.: 13/476,907

(22) Filed: May 21, 2012

(65) Prior Publication Data

US 2012/0291234 A1 Nov. 22, 2012

Related U.S. Application Data

(60) Provisional application No. 61/487,810, filed on May 19, 2011.

(51) Int. Cl.
| | | |
|---|---|---|
| *A44B 11/26* | (2006.01) | |
| *B64D 17/46* | (2006.01) | |
| *B64D 17/52* | (2006.01) | |

(52) U.S. Cl.
CPC ............... *B64D 17/46* (2013.01); *B64D 17/52* (2013.01)
USPC ...... 24/323; 244/149; 244/151 A; 244/151 B; 244/151 R

(58) Field of Classification Search
USPC ............ 24/323; 244/148, 149, 151 A, 151 B, 244/151 R, 152
See application file for complete search history.

(56) References Cited

U.S. PATENT DOCUMENTS

| | | |
|---|---|---|
| 1,631,767 A | 6/1927 | Russell |
| 2,100,693 A | 11/1937 | Irvin |
| 2,375,655 A | 5/1945 | Irvin |
| 2,467,038 A | 4/1949 | Kajdan |
| 3,120,365 A * | 2/1964 | Gutacker ...................... 244/149 |

(Continued)

FOREIGN PATENT DOCUMENTS

| | | |
|---|---|---|
| CN | 2410231 Y | 9/2000 |
| CN | 201406024 Y | 2/2010 |

(Continued)

OTHER PUBLICATIONS

International Search Report and Written Opinion mailed Sep. 4, 2012 in Application No. PCT/US12/38882 filed May 21, 2012.

(Continued)

*Primary Examiner* — Robert J Sandy
*Assistant Examiner* — David Upchurch
(74) *Attorney, Agent, or Firm* — Kilpatrick Townsend & Stockton LLP

(57) ABSTRACT

A separating mechanism for releasing an equipment bag. The mechanism includes a base assembly, a removable soft loop assembly, an attachment ring, and a retention member. The base assembly includes a base member, an aperture, and one or more base assembly rings. The soft loop assembly includes a soft loop base and a soft loop. The soft loop is inserted through the aperture and a first of the base assembly rings. The soft loop base is configured to not be pulled through the aperture. A last of the base assembly rings is inserted through the attachment ring. The retention member is inserted through the soft loop to restrain the first base assembly ring. The base assembly rings are sequentially engaged to couple the attachment ring with the base member. The retention member is pulled out of the soft loop to release the base assembly rings thereby releasing the attachment ring.

19 Claims, 9 Drawing Sheets

(56) References Cited

U.S. PATENT DOCUMENTS

| | | |
|---|---|---|
| 3,132,779 A | 5/1964 | Gray |
| 3,154,272 A | 10/1964 | Gold |
| 3,908,937 A | 9/1975 | Poynter |
| 4,289,286 A | 9/1981 | Spinosa et al. |
| 4,318,502 A | 3/1982 | Lowe et al. |
| 4,337,913 A | 7/1982 | Booth |
| 4,923,150 A | 5/1990 | Calkins et al. |
| 5,129,560 A | 7/1992 | Herman |
| 5,148,956 A | 9/1992 | Funk |
| 5,628,548 A | 5/1997 | Lacoste |
| 6,270,128 B1 | 8/2001 | Coe |
| 6,431,495 B1 | 8/2002 | Lawyer |
| 6,889,942 B2 | 5/2005 | Preston |
| 6,983,913 B2 | 1/2006 | Auvray |
| 7,837,152 B2 | 11/2010 | Booth |
| 8,123,171 B2 | 2/2012 | McHugh et al. |
| 8,157,138 B2 | 4/2012 | Leyendecker |
| 2009/0026319 A1 | 1/2009 | Strong |
| 2009/0127395 A1 | 5/2009 | Fradet |
| 2010/0001140 A1 | 1/2010 | McHugh et al. |
| 2011/0155857 A1 | 6/2011 | Deazley |
| 2011/0168846 A1 | 7/2011 | Strong |
| 2012/0068017 A1 | 3/2012 | Gummeson |

FOREIGN PATENT DOCUMENTS

| | | |
|---|---|---|
| GB | 493958 | 10/1938 |
| GB | 591340 | 8/1947 |
| GB | 772729 | 4/1957 |
| GB | 899459 | 6/1962 |
| GB | 903777 | 8/1962 |
| GB | 969687 | 9/1964 |
| GB | 1 449 253 | 9/1976 |
| GB | 1 504 383 | 3/1978 |
| JP | 2002-166894 | 6/2002 |

OTHER PUBLICATIONS

Army TM 10-1670-327-23&P, "Technical Filed Maintenance Manual Including Repair Parts and Special Tools Lists for MC-6 Personnel Parachute System NSN1670-01-527-7537," [online] Headquarters, Department of Army, Jan. 15, 2009, pp. 0007-19, 0044-1, 0044-2. [retrieved on Jul. 26, 2012]. Retrieved from the Internet: <URL: http://www.liberatedmanuals.com/TM-10-1670-327-23-and-P.pdf>.

* cited by examiner

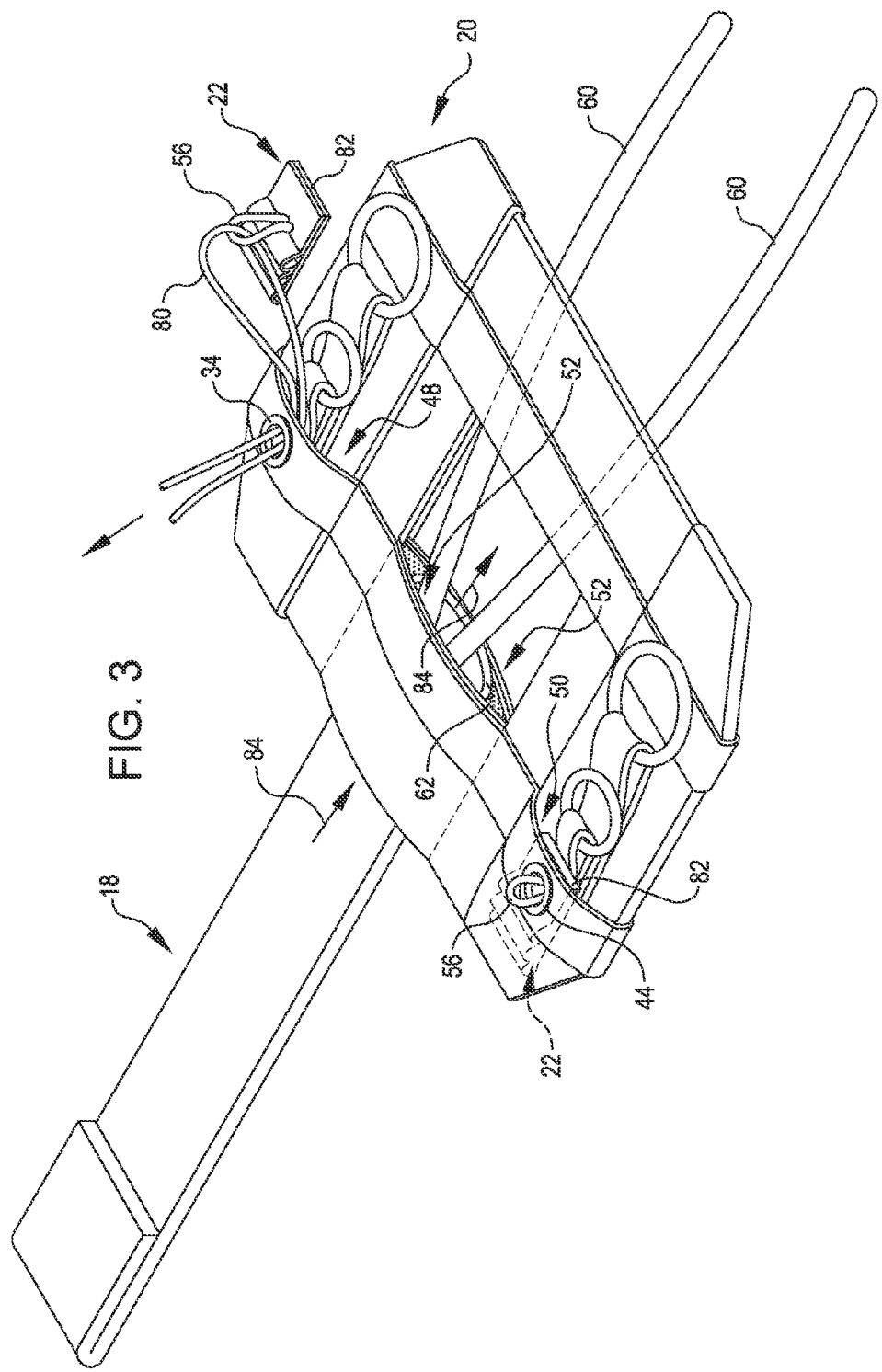

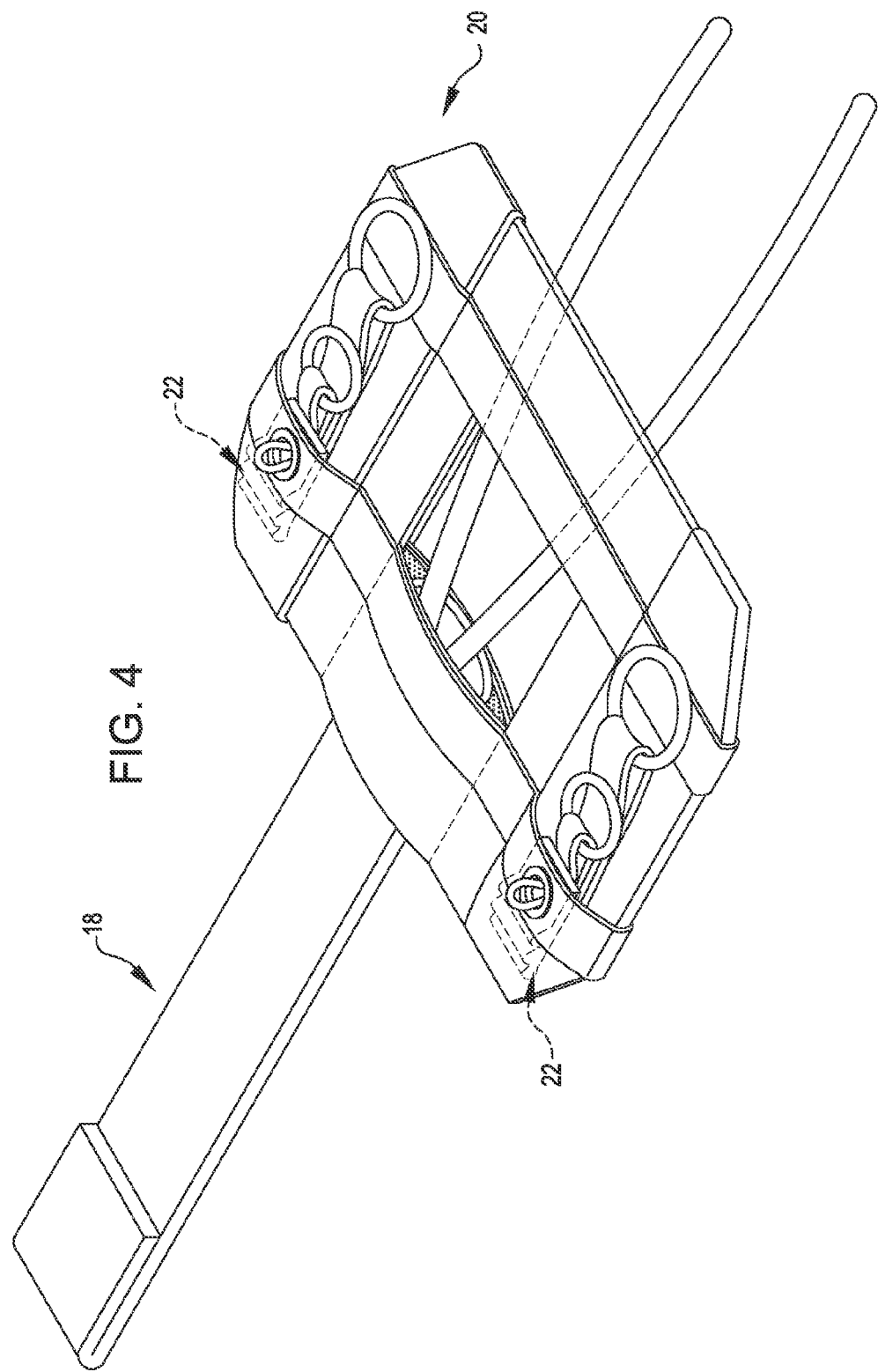

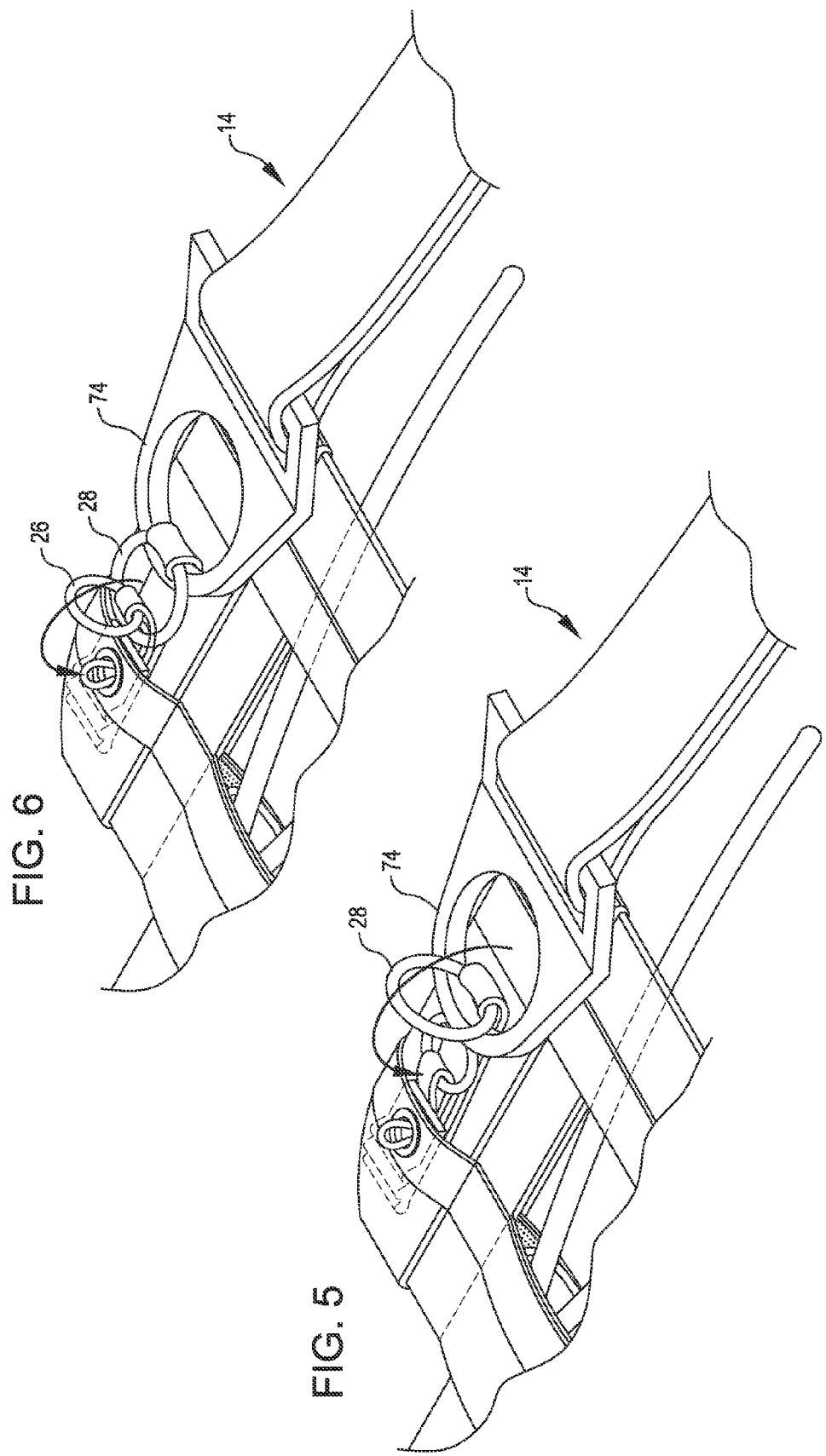

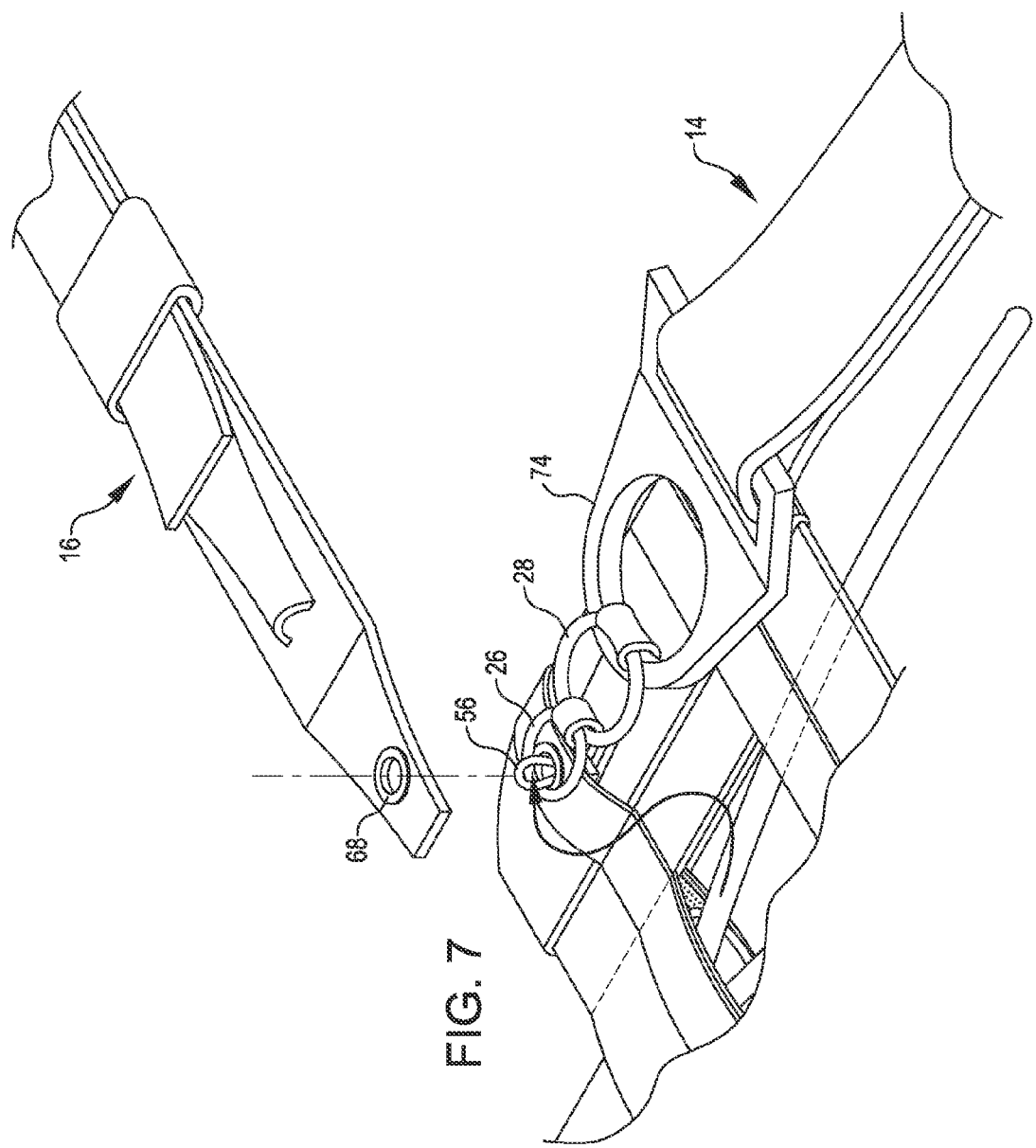

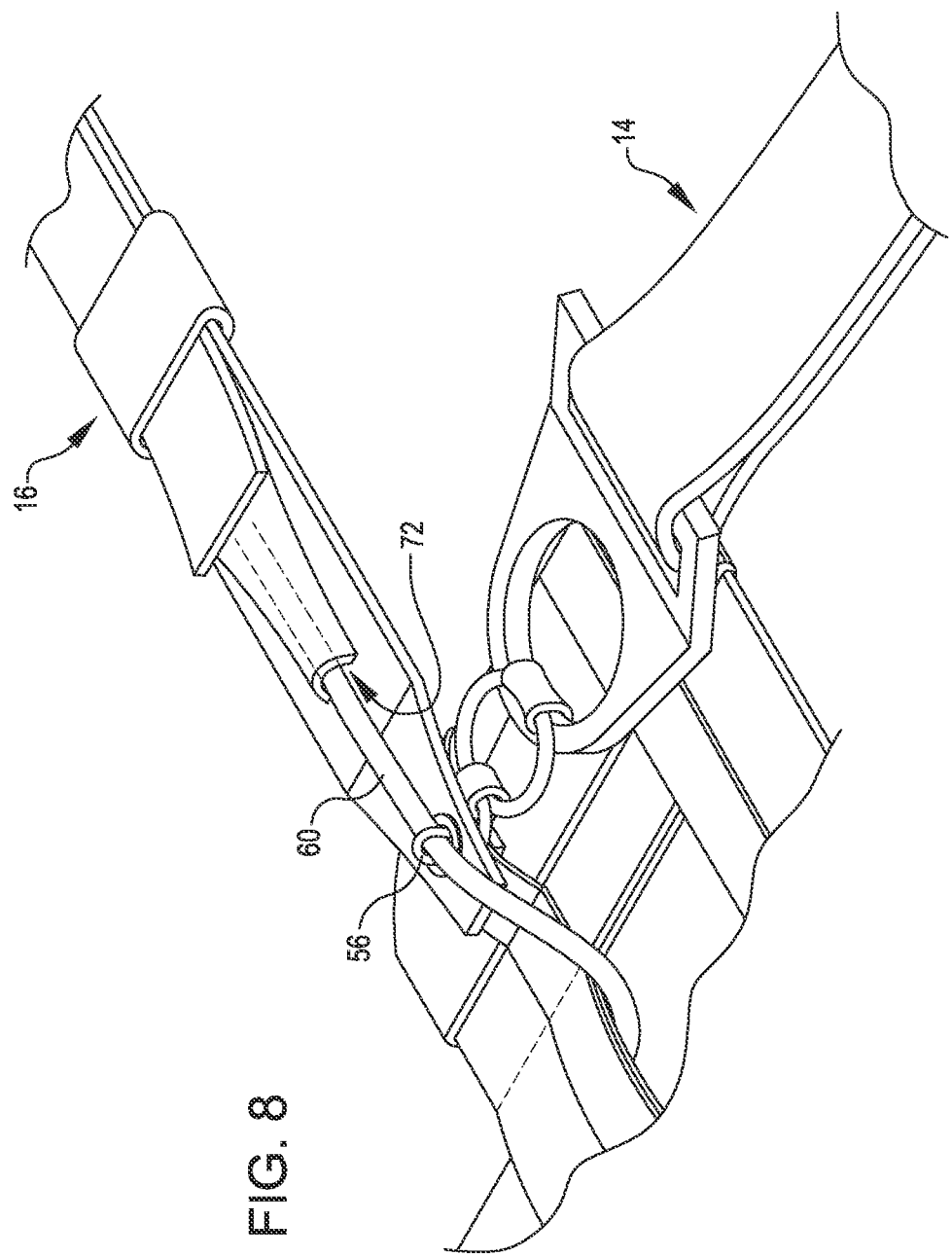

RELEASABLE PACK FOR PARACHUTING WHEN CARRYING EQUIPMENT

CROSS-REFERENCES TO RELATED APPLICATIONS

This application claims the benefit of U.S. Provisional Application No. 61/487,810, entitled "RELEASABLE PACK FOR PARACHUTING WHEN CARRYING EQUIPMENT," filed May 19, 2011, the entire disclosure of which is hereby incorporated herein by reference.

BACKGROUND

The present invention relates to a separating mechanism for releasing an equipment bag while parachuting. For example, a paratrooper can use the equipment bag to carry weapons, ammunition, and assorted equipment. The added weight associated with the equipment bag makes it advantageous to release the equipment bag prior to the parachutist landing so as to avoid subjecting the parachutist to increased impact forces, thereby helping to reduce possible injury.

Many existing equipment bags are coupled with the parachutist by way of a separating mechanism that allows the equipment bag to be repeatedly coupled with and decoupled from the parachutist. Existing separating mechanisms often include locking soft loops. Over time, however, the locking soft loops begin to tear and/or fray such that extensive repair or replacement of the equipment bag is required. In addition to the locking soft loops, existing separating mechanisms often include additional release loops. The additional release loops may also deteriorate over time from, for example, overuse, heavy weight, and dry weather, until the additional release loops lock up, thereby inhibiting proper release of the equipment bag.

Accordingly, there is a need for improved separating mechanisms that do not suffer from the foregoing problems.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Improved separating mechanisms for releasing an equipment bag from a parachutist are disclosed. In many embodiments, a separating mechanism includes a removable locking soft loop(s) that can be easily replaced when the locking soft loop(s) becomes torn, frayed, or otherwise unfit for continued use. In many embodiments, a separating mechanism includes a ring release system instead of webbing and/or cord loops. Such a ring release system is stronger than a loop release system and has significantly lower chance of locking up and failing to release the equipment bag. In many embodiments, the equipment bag is contoured in an aerodynamic shape (e.g., an inverted pyramid), thereby making it easier for the parachutist to maintain stability during free fall. And in many embodiments, the equipment bag includes an integral cinch cord(s) to better secure items inside the equipment bag as well as to constrain loose portions of the equipment bag.

Thus, in one aspect, a separating mechanism for releasing an equipment bag while parachuting is disclosed. The separating mechanism includes a base assembly, a removable locking soft loop assembly, an attachment ring, and a retention member. The base assembly includes a base member, an aperture coupled with the base member, and one or more base assembly rings coupled with the base member. The removable locking soft loop assembly includes a locking soft loop base and a locking soft loop attached to the locking soft loop base. The locking soft loop is configured to be inserted through the aperture and a first of the one or more base assembly rings. The locking soft loop base is configured to not be pulled through the aperture due to an operational load applied to the locking soft loop. A last of the one or more base assembly rings is configured to be inserted through the attachment ring. The retention member is configured to be inserted through the locking soft loop so as to retain the first base assembly ring. The one or more base assembly rings are configured to be sequentially engaged to constrain the last base assembly ring so as to couple the attachment ring with the base member. The retention member is configured to be pulled out of the locking soft loop to release the first base assembly ring thereby sequentially releasing the one or more base assembly rings so as to release the attachment ring.

In many embodiments, the base member is attached to the equipment bag. The separating mechanism can include a releasable leg strap that includes a leg strap aperture through which the locking soft loop is inserted. The leg strap is retained to the base assembly by the retention member until released by the retention member being pulled out of the locking soft loop. The releasable leg strap can include a leg strap sleeve configured to receive and restrain a free end of the retention member. The base assembly can also include a base assembly sleeve configured to receive and restrain a free end of the retention member.

In many embodiments, the one or more base assembly rings includes a series of two or more progressively sized rings. And in many embodiments, the one or more base assembly rings are substantially rigid.

In many embodiments, the removable locking soft loop assembly is not fixedly attached to the base assembly. In many embodiments, the base assembly is configured to retain the removable locking soft loop assembly after the attachment ring is released. For example, the locking soft loop assembly can be retained between the aperture and the base member after the attachment ring is released. The removable locking soft loop assembly can include a removal tab coupled with the locking soft loop base. The removal tab provides a gripping surface by which a user can pull the removable locking soft loop assembly free from the base assembly to facilitate replacement of the removable locking soft loop assembly.

In many embodiments, the retention member is flexible. A grasping feature can be attached to the retention member. The grasping feature is configured to be pulled by a user to pull the retention member out of the locking soft loop to release the attachment ring.

In many embodiments, the separating mechanism is configured to couple two attachment rings to the base member and to release both of the attachment rings from the base member substantially simultaneously. For example, the separating mechanism can further include a second aperture coupled with the base member, one or more base assembly second rings coupled with the base member, a second removable locking soft loop assembly, a second attachment ring, and a second retention member. The second removable locking soft loop assembly includes a second locking soft loop base and a second locking soft loop coupled with the second locking soft loop base. The second locking soft loop is configured to be inserted through the second aperture and a first of the one or more base assembly second rings. The second locking soft loop base is configured to not be pulled through the second aperture due to the operation load applied to the second locking soft loop. A last of the one or more base assembly second rings is configured to be inserted through the second attachment ring. The second retention member is configured to be inserted through the second locking soft loop so as to restrain the first base assembly second ring. The one or more base assembly second rings are configured to be sequentially engaged to constrain the last base assembly second ring so as to couple the second attachment ring with the base member. The second retention member is configured to be pulled out of the second locking soft loop to release the first base assembly second ring thereby sequentially releasing the one or more base assembly second rings so as to release the second attachment ring.

In many embodiments, both retention members are flexible and are attached to a grasping feature configured to be pulled by a user to pull both retention members out of both locking soft loops so as to release both attachment rings at substantially the same time. In many embodiments, the base assembly includes a grasping feature passageway through which the grasping feature is inserted and by which the grasping feature is retained to the base assembly prior to release of the attachment rings.

In many embodiments, one or more series of two or more progressively sized rings are used. For example, the one or more base assembly rings can include a series of two or more progressively sized rings. And the one or more base assembly second rings can include a second series of two or more progressively sized rings.

In many embodiments, the removable locking soft loop assemblies are not fixedly attached to the base assembly. And in many embodiments, the base assembly is configured to retain the removable locking soft loop assemblies after the attachment rings are released. For example, the locking soft loop assemblies can be retained between the respective aperture and the base member after the attachment rings are released. Each of the removable locking soft loop assemblies can include a removal tab coupled with the locking soft loop base. The removal tab provides a gripping surface by which a user can pull the removable locking soft loop assembly free from the base assembly to facilitate replacement of the removable locking soft loop assembly.

In another aspect, an equipment bag that is releasable from a parachutist during parachuting is disclosed. The equipment bag includes an enclosure configured to carry equipment, a base assembly, a removable locking soft loop assembly, an attachment ring, and a retention member. The base assembly includes a base member attached to the enclosure, an aperture coupled with the base member, and one or more base assembly rings coupled with the base member. The removable locking soft loop assembly includes a locking soft loop base and a locking soft loop attached to the locking soft loop base. The locking soft loop is configured to be inserted through the aperture and a first of the one or more base assembly rings. The locking soft loop base is configured to not be pulled through the aperture due to an operational load applied to the locking soft loop. A last of the one or more base assembly rings is configured to be inserted through the attachment ring. The retention member is configured to be inserted through the locking soft loop so as to retain the first base assembly ring. The one or more base assembly rings are configured to be sequentially engaged to constrain the last base assembly ring so as to couple the attachment ring with the base member. The retention member is configured to be pulled out of the locking soft loop to release the first base assembly ring thereby sequentially releasing the one or more base assembly rings so as to release the attachment ring.

For a fuller understanding of the nature and advantages of the present invention, reference should be made to the ensuing detailed description and accompanying drawings.

BRIEF DESCRIPTION OF THE DRAWINGS

FIG. 3 illustrates the installation of removable locking soft loops and the installation of a retention member assembly in the separating mechanism of FIG. 1.

FIG. 4 illustrates installed configurations of the removable soft loops and the retention member assembly in the separating mechanism of FIG. 1.

FIG. 5 through FIG. 8 illustrate a procedure for coupling an attachment ring and a leg strap to the separating mechanism of FIG. 1, in accordance with many embodiments.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Separating Mechanism

Figure 1:
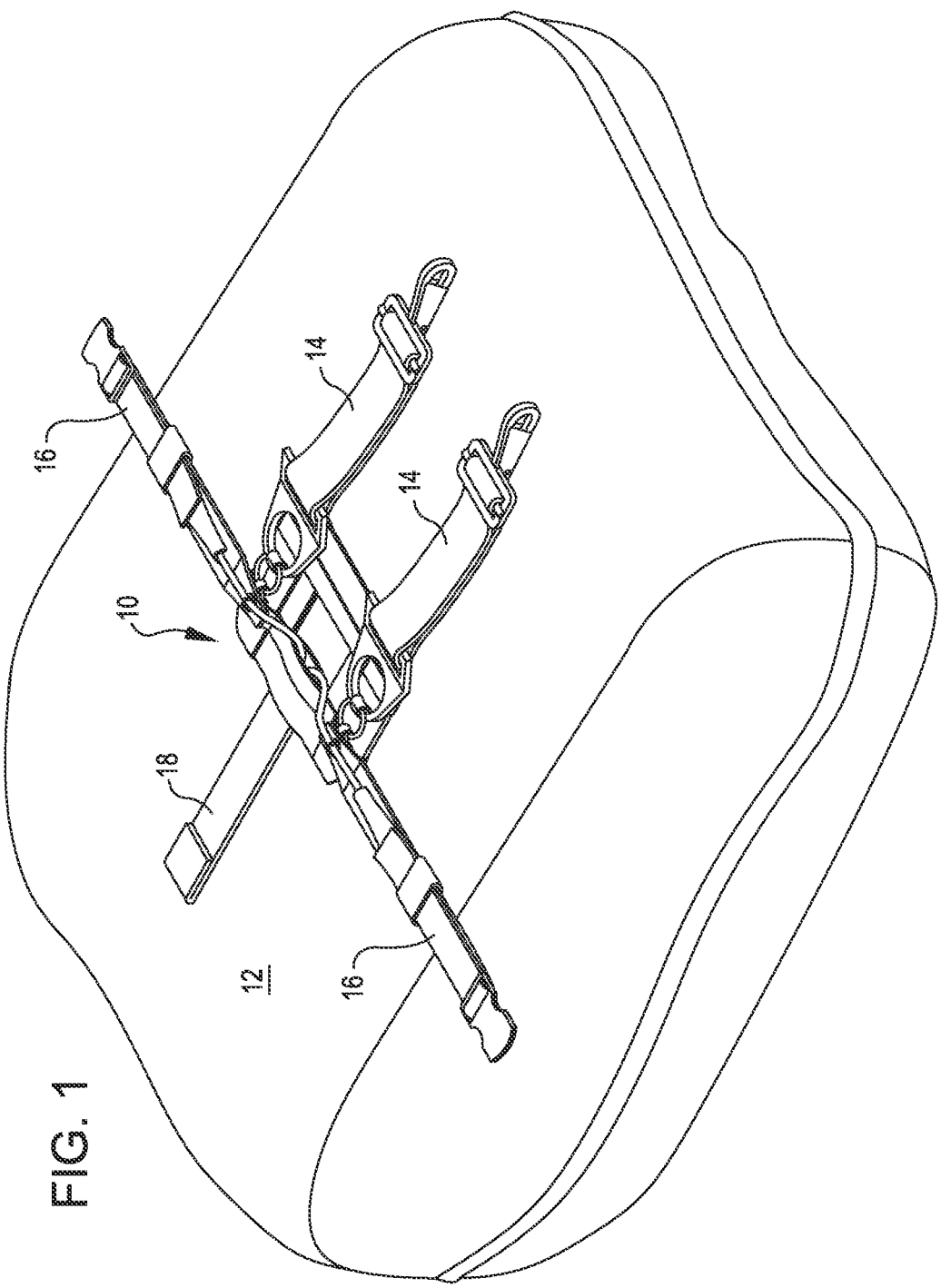
FIG. 1 is shows a separating mechanism attached to an equipment bag for releasing the equipment bag from a parachutist while parachuting, in accordance with many embodiments.

Referring now to the drawings, in which like reference numerals represent like parts throughout the several views, FIG. 1 shows a separating mechanism 10 attached to an equipment bag 12 for releasing the equipment bag 12 from a parachutist while parachuting, in accordance with many embodiments. Two attach straps 14 and two leg straps 16 are shown coupled with the equipment bag 12 via the separating mechanism 10. The separating mechanism 10 includes a release member 18 that is pulled by the parachutist to substantially simultaneously release the equipment bag 12 from both attach straps 14 and both leg straps 16, thereby releasing the equipment bag 12.

Figure 2:
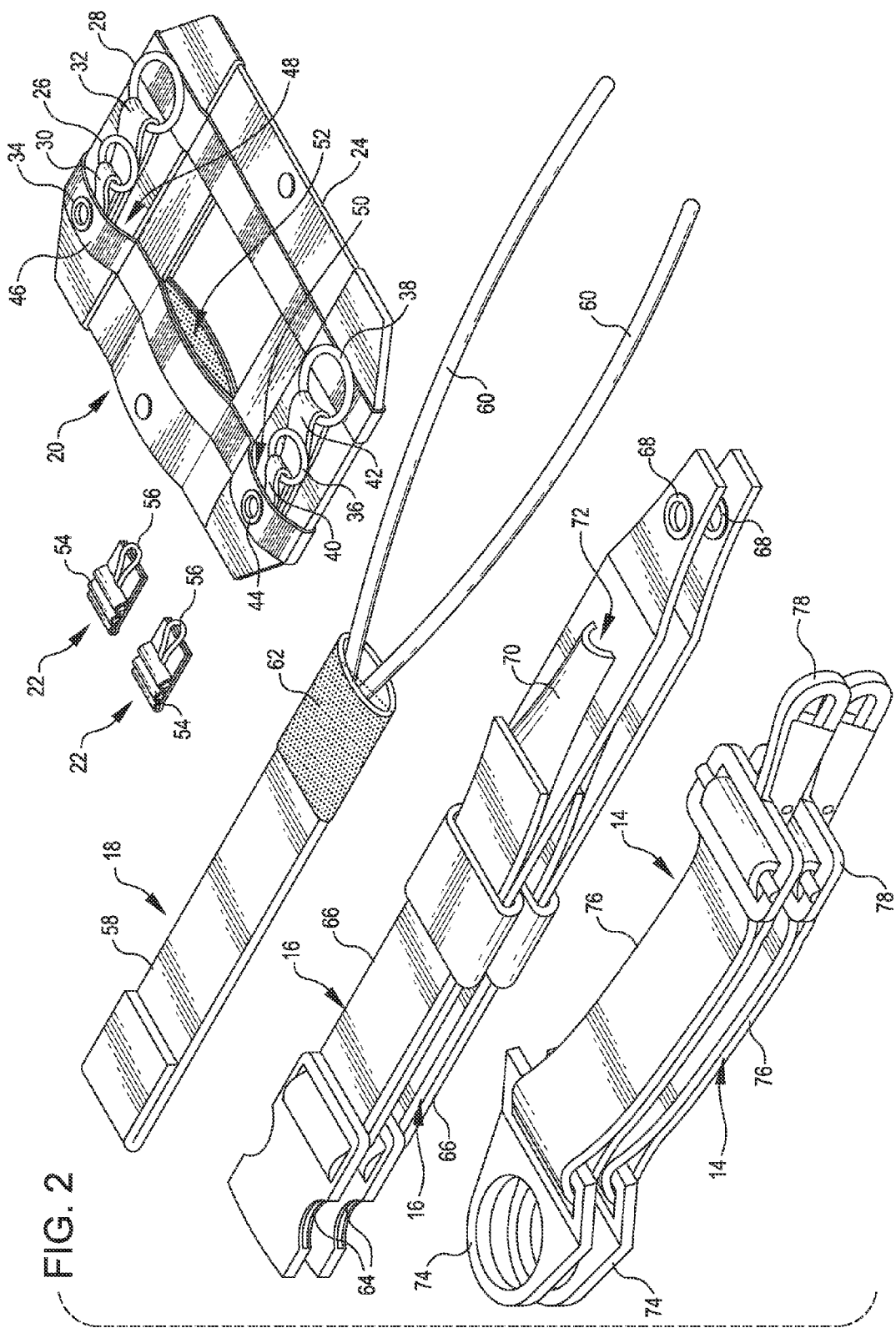
FIG. 2 shows various sub-assemblies of the separating mechanism of FIG. 1.

FIG. 2 shows various sub-assemblies of the separating mechanism 10. The sub-assemblies of the separating mechanism 10 include a base assembly 20, two removable locking soft loop assemblies 22, the two attachment straps 14, the two leg straps 16, and the release member 18.

In many embodiments, the base assembly 20 is attached to the equipment bag 12. The base assembly 20 includes a base member 24, a first series of progressively sized rings 26, 28 that are coupled to the base member 24 via respective coupling straps 30, 32, a first framed aperture 34 disposed adjacent to the ring 26, a second series of progressively sized rings 36, 38 that are coupled to the base member 24 via respective coupling straps 40, 42, and a second framed aperture 44 disposed adjacent to the ring 36. In the first series of progressively sized rings, each ring in the series starting with ring 26 is configured to pass through the central opening of the next ring 28 in the series. Likewise, in the second series of progressively sized rings, each ring in the series starting with ring 36 is configured to pass through the central opening of the next ring 38 in the series. And while there are two rings in each of the first and second series of progressively sized rings, one and more than two rings can be employed, with each ring in the series sized to pass through the central opening in the next ring in the series. The first and second framed apertures 34 and 44 are formed in a strap 46, which is attached to the base member 24 so as to form pockets 48, 50 between the strap 46 and the base member 24. Each of the pockets 48, 50 are sized to accommodate and retain one of the removable locking soft loop assemblies 22. The base assembly 20 has a passageway 52 sized and configured to accommodate and retain the release member 18, which is inserted partially through the passageway 52. The base assembly 20 is suitably configured to react loads between the equipment bag 12, the two attach straps 14, and the two leg straps 16.

Each of the removable locking soft loop assemblies 22 includes a soft loop base 54 and a soft loop 56 attached to the soft loop base 54. The soft loop 56 is configured to be inserted through one of the framed apertures 34, 44 from the interior of the corresponding pocket 48, 50 so as to extend outwardly from the framed aperture with the soft loop base 54 being disposed in the pocket and retained therein absent being extracted therefrom. The soft loop base 54 is configured so that it cannot be pulled through the framed aperture by the application of any expected operational tension load applied to the soft loop. While the soft loop base 54 shown has a pleated reinforced strap construction as shown, any suitable configuration for the soft loop base 54 can be used.

The release member 18 includes a grasping feature 58, two flexible retention members 60, and a mid-section 62. The grasping feature 58 serves as an actuation handle that is grasped and pulled by the parachutist to release the equipment bag 12. In many embodiments, each of the two retention member 60 are attached to the grasping feature 58 at the mid-section 62. The mid-section 62 includes an outer surface that can include a surface preparation and/or material that serves to enhance retention of the release member 18 in the passageway 52. For example, the mid-section 62 and the passageway 52 can have attachment type surfaces (e.g., Velcro) that interact to retain the mid-section 62 in the passageway 52 absent being pulled from the passageway 52 when the parachutist releases the equipment bag 12.

Each of the leg straps 16 includes a quick connect buckle 64 and an adjustable strap 66. Disposed at the end of each adjustable strap 66 is a framed aperture 68. A sleeve 70 is formed on each of the adjustable straps 66. Each sleeve 70 and the corresponding adjustable strap 66 define a passageway 72 configured to accommodate an end portion of one of the retention members 60 and thereby constrain the position and orientation of the end portion of the retention member 60.

Each of the attach straps 14 include an attachment ring 74, a strap 76, and an attachment end fitting 78. The attachment ring 74 has a first opening sized such that the end ring 28, 38 in the first and second series of progressively sized rings can be passed through the first opening. The attachment ring 74 also has a second opening by which the strap 76 is coupled with the attachment ring 74. The attachment end fitting 78 is configured for convenient attachment and detachment to suitable feature (e.g., D-ring) coupled with the parachutist.

FIG. 3 illustrates an approach for installing the removable locking soft loop assemblies 22 into the base assembly 20. A length of chord 80 is partially inserted through the soft loop 56. The free ends of the chord 80 are then passed through the framed aperture 34 from the pocket 48 side of the framed aperture 34. The soft loop 56 is then pulled through the framed aperture 34 while the removable locking soft loop assembly 22 is inserted into the pocket 48. An installed removable locking soft loop assembly 22 is shown with the corresponding soft loop 56 extending through the framed aperture 44. Each of the removable locking soft loop assemblies 22 can be removed from the corresponding pocket 48, 50 by grasping an end tab portion 82 of the soft loop base 54 and pulling the locking soft loop assembly 22 free from the corresponding pocket 48, 50. FIG. 3 also illustrates installation of the release member 18 into the base assembly 20 by passing the retention members 60 through the passageway 52 in the direction of arrows 84 and positioning the mid-section 62 to reside within the passageway 52. FIG. 4 shows the base assembly 20 with the release member 18 and both of the removable soft loop assemblies 22 installed.

Figure 9:
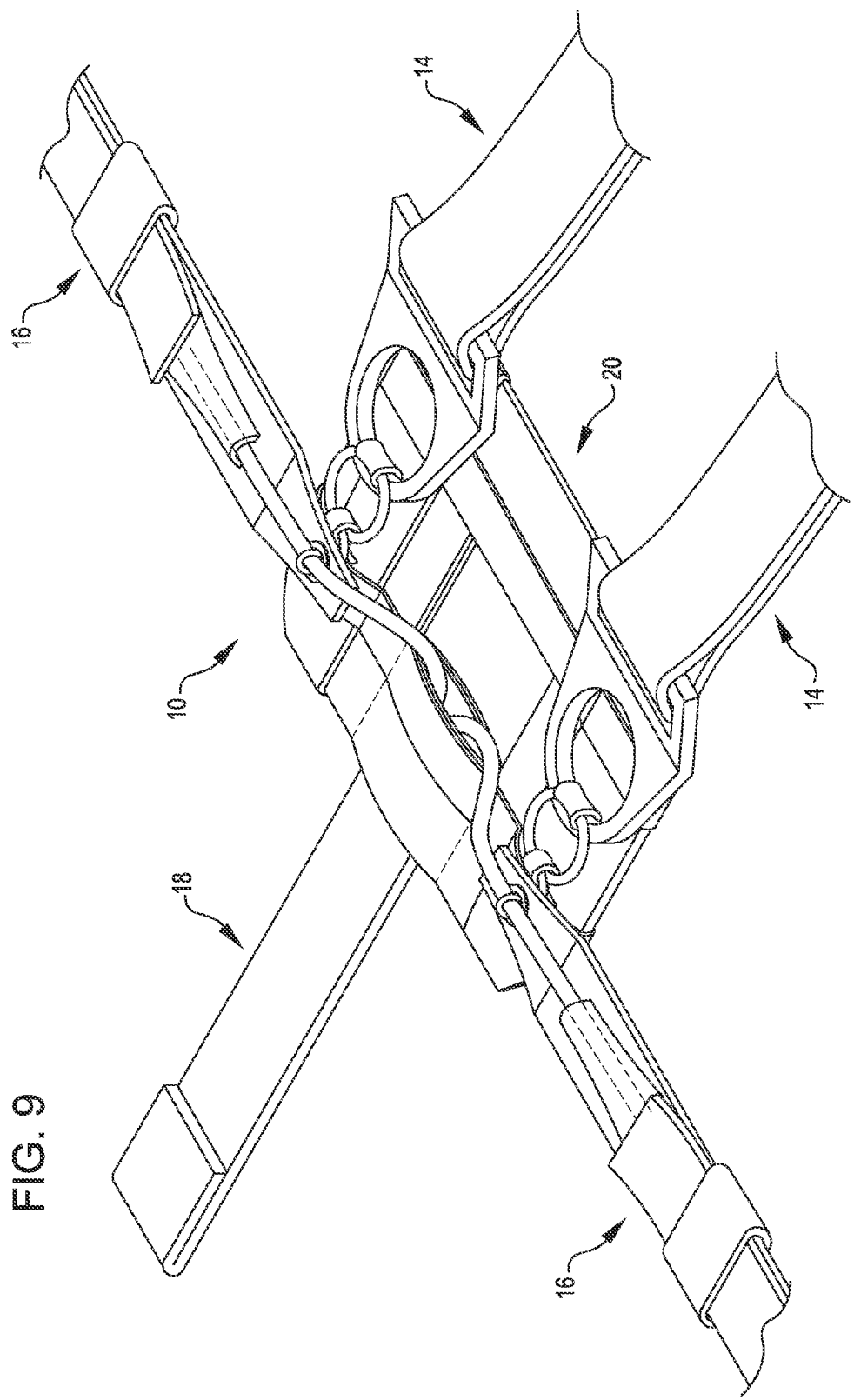
FIG. 9 shows two attachment rings and two leg straps coupled to the separating mechanism of FIG. 1, in accordance with many embodiments.

FIG. 5 through FIG. 8 show a sequence of acts used to couple the equipment bag 12 with the parachutist via the separating mechanism 10. Each of the attachment straps 14 are coupled with the base assembly 20 via one of the series of progressively sized rings. As shown in FIG. 5, the attachment ring 74 is positioned as shown and the end ring 28 is rotated through the first opening of the attachment ring 74 as shown into the position shown in FIG. 6. Next, the smaller ring 26 is rotated through the end ring 28 as shown in FIG. 6 into the position shown in FIG. 7 in which the soft loop 56 protrudes through the smaller ring 26. Next, the protruding portion of the soft loop 56 is inserted through the framed aperture 68 of the leg strap 16. Finally, as shown in FIG. 8, one of the retention members 60 is inserted through the soft loop 56 and the end portion of the retention member 60 is inserted into and stowed in the passageway 72 in the leg strap 16. The foregoing procedure is repeated to couple the other attachment strap 14 and the other leg strap 16 to the base assembly 20. FIG. 9 shows the fully coupled configuration of the separating mechanism 10 with both attachment straps 14 and both leg straps 16 coupled with the base assembly 20.

As will be obvious to a person of skill in the art, the configuration of the separating mechanism 10 can be varied in any suitable manner. For example, one or both of the leg straps can be optionally omitted. And the base assembly 20 can further include a sleeve feature(s) (like the sleeve feature 70 on the leg strap 16) into which the end portion of the retention member 60 can be inserted and thereby restrained when one or both of the leg straps 16 are not used. Preferably, the first and second series of progressively sized rings 26, 28, 36, 38 are rigid rings (e.g., a suitable metal) to enhance decoupling characteristics when the equipment bag 12 is released. Non-rigid rings (e.g., suitable webbing and/or cord soft loops) can also be used. Rigid rings, however, are typically stronger and offer almost no possibility of locking up on the parachutist and not releasing.

When the release member 18 is pulled, the soft loops 56 fall through the smaller rings 26, 36, and the smaller rings 26, 36 fall through the larger rings 28, 38 sequentially, thereby releasing the equipment bag 12 from the attachment straps 14, which are typically attached to the jumpers parachute harness.

When the jumper pulls the release member 18 to pull the retention members 60 through the soft loops 56, the rings 26, 28, 36, 38 74 are released and the attachment straps 14 are left attached to the jumpers harness. The equipment bag 12 releases and drops to the length of an attachment line that is also attached to the jumpers harness and the equipment bag 12 is left hanging below the jumper at a safe distance.

The equipment bag 12 can attach to the jumper with the separating mechanism 10 on top. The leg straps 16 serve to keep the bag close to the jumper. When the jumper reaches the proper altitude under canopy, the jumper pulls the release member 18 thereby releasing the bag to a safe distance away from the jumper on a lowering line (usually 7 to 15 feet) before the jumper lands on the ground.

Aerodynamic Shaped Equipment Bags

Figure 10:
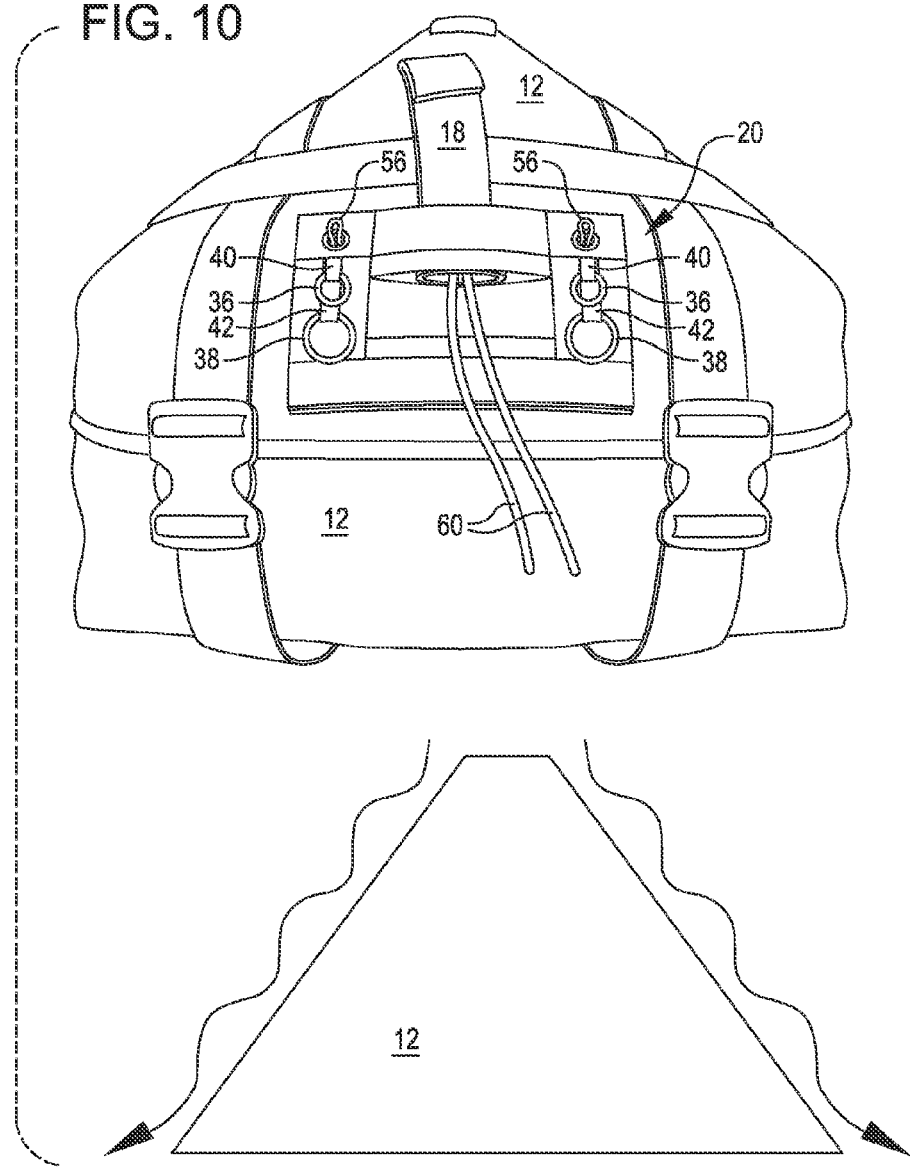
FIG. 10 shows an equipment bag having an aerodynamic shape, in accordance with many embodiments.

FIG. 10 shows an aerodynamically shaped equipment bag 12 with an attached separating mechanism. In the embodiment shown, the equipment bag 12 has a pyramid shape configured to stabilize the orientation of the equipment bag 12 during free fall. Existing bags are square or round when packed and therefore have poor aerodynamics making it difficult for the jumper to maneuver when in flight or free fall. In contrast, the aerodynamically shaped equipment bag 12 is contoured in the shape of a pyramid so that the equipment bag 12 generates less drag and is more stable making it easier for the jumper to maintain stability during flight or free fall. The pyramid shape of the equipment bag 12 allows the air to move around the equipment bag 12 evenly rather than catching the bag in various areas causing tipping and backsliding that inhibit the jumper from maneuvering properly in the air.

Integral Cinch Cord

Figure 11:
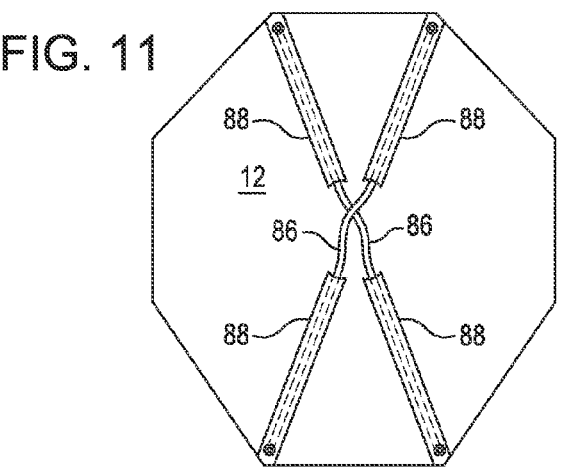
FIG. 11 shows an equipment bag having an integral cinch cord, in accordance with many embodiments.

FIG. 11 shows an equipment bag 12 having an integral cinch cord 86, in accordance with many embodiments. After filling the equipment bag 12, the cinch cord 86 can be used to secure the load. In contrast, existing bags must be rolled over and secured to eliminate excess material of the bag not securing the load properly and creating more work for the user during rigging. The cinch cord 86 is routed through a channel 88 sewn internally to the equipment bag 12 and is tensioned to secure excess material around the load inside the bag. The cinch cord 86 can be a pre-tensioned elastic cord (e.g., bungee type chord) that can stretch and contract in response to the particular contents in the equipment bag 12. The cinch cord 86 can also be a non-flexible cord. The cinch cord can also be pulled by the user to shorten the cinch cord 86 and then tied or otherwise secured to retain the shortened length and thereby secure the load.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A separating mechanism for releasing an equipment bag while parachuting, the separating mechanism comprising:
   a base assembly including a base member, an aperture coupled with the base member, and one or more base assembly rings coupled with the base member;
   a removable locking soft loop assembly configured to be removed from the base assembly, the removable locking soft loop assembly including a locking soft loop base and a locking soft loop attached to the locking soft loop base, the locking soft loop configured to be inserted through the aperture and a first of the one or more base assembly rings, the locking soft loop base being configured to not be pulled through the aperture due to an operational load applied to the locking soft loop and configured to be removed from the base member and the aperture of the base assembly so as to facilitate replacement of the removable locking soft loop assembly;
   an open-ended pocket having one or more open ends, wherein the removable locking soft loop assembly is configured to be separably coupled with the base assembly by insertion into the pocket through one of said one or more open ends and configured to be removed from the base assembly by extraction from the pocket through the same or another of said one or more open ends;
   an attachment ring, a last of the one or more base assembly rings configured to be inserted through the attachment ring; and
   a retention member configured to be inserted through the locking soft loop so as to restrain the first base assembly ring, the one or more base assembly rings configured to be sequentially engaged to constrain the last base assembly ring so as to couple the attachment ring with the base member, the retention member configured to be pulled out of the locking soft loop to release the first base assembly ring thereby sequentially releasing the one or more base assembly rings so as to release the attachment ring.

2. The separating mechanism of claim 1, wherein the base member is attached to the equipment bag.

3. The separating mechanism of claim 2, further comprising a releasable leg strap that includes a leg strap aperture through which the locking soft loop is inserted, the leg strap being retained to the base assembly by the retention member until released by the retention member being pulled out of the locking soft loop.

4. The separating mechanism of claim 3, wherein the releasable leg strap includes a leg strap sleeve configured to receive and restrain a free end of the retention member.

5. The separating mechanism of claim 1, wherein the base assembly includes a base assembly sleeve configured to receive and restrain a free end of the retention member.

6. The separating mechanism of claim 1, wherein the one or more base assembly rings include a series of two or more progressively sized rings.

7. The separating mechanism of claim 1, wherein the one or more base assembly rings are substantially rigid.

8. The separating mechanism of claim 1, wherein the removable locking soft loop assembly is not fixedly attached to the base assembly.

9. The separating mechanism of claim 8, wherein the base assembly is configured to retain the removable locking soft loop assembly after the attachment ring is released.

10. The separating mechanism of claim 9, wherein the locking soft loop base is retained between the aperture and the base member after the attachment ring is released.

11. The separating mechanism of claim 10, wherein the removable locking soft loop assembly includes a removal tab coupled with the locking soft loop base, the removable tab providing a gripping surface by which a user can pull the removable locking soft loop assembly free from the base assembly to facilitate replacement of the removable locking soft loop assembly.

12. The separating mechanism of claim 1, wherein:
the retention member is flexible; and
a grasping feature is attached to the retention member and configured to be pulled by a user to pull the retention member out of the locking soft loop to release the attachment ring.

13. The separating mechanism of claim 1, further comprising:
a second aperture coupled with the base member;
one or more base assembly second rings coupled with the base member;
a second removable locking soft loop assembly including a second locking soft loop base and a second locking soft loop coupled with the second locking soft loop base, the second locking soft loop configured to be inserted through the second aperture and a first of the one or more base assembly second rings, the second locking soft loop base being configured to not be pulled through the second aperture due to the operational load applied to the second locking soft loop;
a second attachment ring, a last of the one or more base assembly second rings configured to be inserted through the second attachment ring; and
a second retention member configured to be inserted through the second locking soft loop so as to restrain the first base assembly second ring, the one or more base assembly second rings configured to be sequentially engaged to constrain the last base assembly second ring so as to couple second attachment ring with the base member, the second retention member configured to be pulled out of the second locking soft loop to release the first base assembly second ring thereby sequentially releasing the one or more base assembly second rings so as to release the second attachment ring.

14. The separating mechanism of claim 13, wherein:
the retention member is flexible;
the second retention member is flexible; and
the retention member and the second retention member are attached to a grasping feature configured to be pulled by a user to pull the retention member and the second retention member out of the locking soft loop and the second locking soft loop, respectively, so as to release the attachment ring and the second attachment ring at substantially the same time.

15. The separating mechanism of claim 14, wherein the base assembly includes a grasping feature passageway through which the grasping feature is inserted and by which the grasping feature is retained to the base assembly prior to release of the attachment ring and the second attachment ring.

16. The separating mechanism of claim 13, wherein:
the one or more base assembly rings include a series of two or more progressively sized rings; and
the one or more base assembly second rings include a second series of two or more progressively sized rings.

17. The separating mechanism of claim 13, wherein the base assembly is configured to retain the removable locking soft loop assembly and the second removable locking soft loop assembly after the attachment ring and the second attachment ring are released.

18. The separating mechanism of claim 13, wherein:
the locking soft loop base is retained between the aperture and the base member after the attachment ring is released; and
the second locking soft loop base is retained between the second aperture and the base member after the second attachment ring is released.

19. The separating mechanism of claim 18, wherein:
the removable locking soft loop includes a removal tab coupled with the locking soft loop base, the removable tab providing a gripping surface by which a user can pull the removable locking soft loop free from the base assembly to facilitate replacement of the removable locking soft loop; and
the second removable locking soft loop includes a second removal tab coupled with the second locking soft loop base, the second removable tab providing a second gripping surface by which the user can pull the second removable locking soft loop free from the base assembly to facilitate replacement of the second removable locking soft loop.

* * * * *